US008700656B2

(12) United States Patent
Gutlapalli et al.

(10) Patent No.: US 8,700,656 B2
(45) Date of Patent: Apr. 15, 2014

(54) METHOD AND SYSTEM FOR IMPLEMENTING AN ON-DEMAND SCHEDULER

(75) Inventors: Hari Krishna Gutlapalli, Union City, CA (US); Suhas R. Mehta, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 13/118,260

(22) Filed: May 27, 2011

(65) Prior Publication Data

US 2012/0303647 A1 Nov. 29, 2012

(51) Int. Cl.
*G06F 17/30* (2006.01)

(52) U.S. Cl.
USPC .......................................... 707/769; 707/791

(58) Field of Classification Search
USPC .................................. 707/769, 791
See application file for complete search history.

(56) References Cited

U.S. PATENT DOCUMENTS

| | | | |
|---|---|---|---|
| 6,430,562 B1 | 8/2002 | Kardos et al. | |
| 6,470,329 B1* | 10/2002 | Livschitz | 1/1 |
| 6,657,959 B1* | 12/2003 | Chong et al. | 370/230.1 |
| 7,127,412 B2 | 10/2006 | Powell et al. | |
| 7,155,519 B2 | 12/2006 | Lo et al. | |
| 2001/0027481 A1 | 10/2001 | Whyel | |
| 2004/0216098 A1 | 10/2004 | Roe et al. | |
| 2008/0239992 A1* | 10/2008 | Krasnyanskiy | 370/256 |
| 2009/0030787 A1* | 1/2009 | Pon et al. | 705/14 |
| 2009/0097494 A1* | 4/2009 | Yuan | 370/412 |
| 2009/0199192 A1 | 8/2009 | Laithwaite et al. | |
| 2010/0205226 A1* | 8/2010 | Bezancon et al. | 707/803 |
| 2011/0154231 A1* | 6/2011 | Cherdron et al. | 715/764 |
| 2012/0089696 A1* | 4/2012 | May et al. | 709/213 |
| 2012/0240062 A1* | 9/2012 | Passmore et al. | 715/758 |
| 2012/0287885 A1* | 11/2012 | Dai | 370/329 |

OTHER PUBLICATIONS

So-Young Park, Jeunghyun Byun, Hae-Chang Rim, Do-Gil Lee, and Heuiseok Lim, "Natural Language-Based User Interface for Mobile Devices With Limited Resources", IEEE Transactions on Consumer Electronics, vol. 56, No. 4, Nov. 2010, pp. 2086-2092.*
"Field Service Software & Task Scheduling Systems" May 11, 2008, 3 pages url: http://www.mjc2.com/wireless.htm.
"Welcome to the Real-Time Service Enterprise" Mar. 18, 2009, 2 pages url: http://www.clicksoftware.com/solutions/index.asp.
"Connect + wise mobile" Feb. 13, 2010, 3 pages url: http://www.connectwise.com/connectwise-mobile-1.aspx
"Service Management Software: ServiceCEO Mobile" Apr. 26, 2010, 4 pages http://www.insightdirect.com/products-overview/.
"Shiftboard: Online Scheduling & Communication" Feb. 12, 2010, 4 pages url: http://www.shiftboard.com/shiftboard-faqs.html.
"Genbook" Feb. 9, 2010, 2 pages url: http://www.genbook.com/genbook-for-you.html.

* cited by examiner

*Primary Examiner* — Cheryl Lewis
(74) *Attorney, Agent, or Firm* — Vista IP Law Group, LLP

(57) ABSTRACT

Disclosed is an improved approach for implementing an on-demand scheduler and the structures to support realtime on-demand schedulers. A lightweight word-based structure is disclosed for storing scheduling-related data. Using this lightweight word-based structure enables on-demand and real-time scheduling. This type of lightweight structure also permits scheduling activities to be performed in a disconnected mode, which can then be later synchronized with the server to confirm the booking. In addition to appointment scheduling, this technique can also be implemented for scheduling of any type of resource.

33 Claims, 12 Drawing Sheets

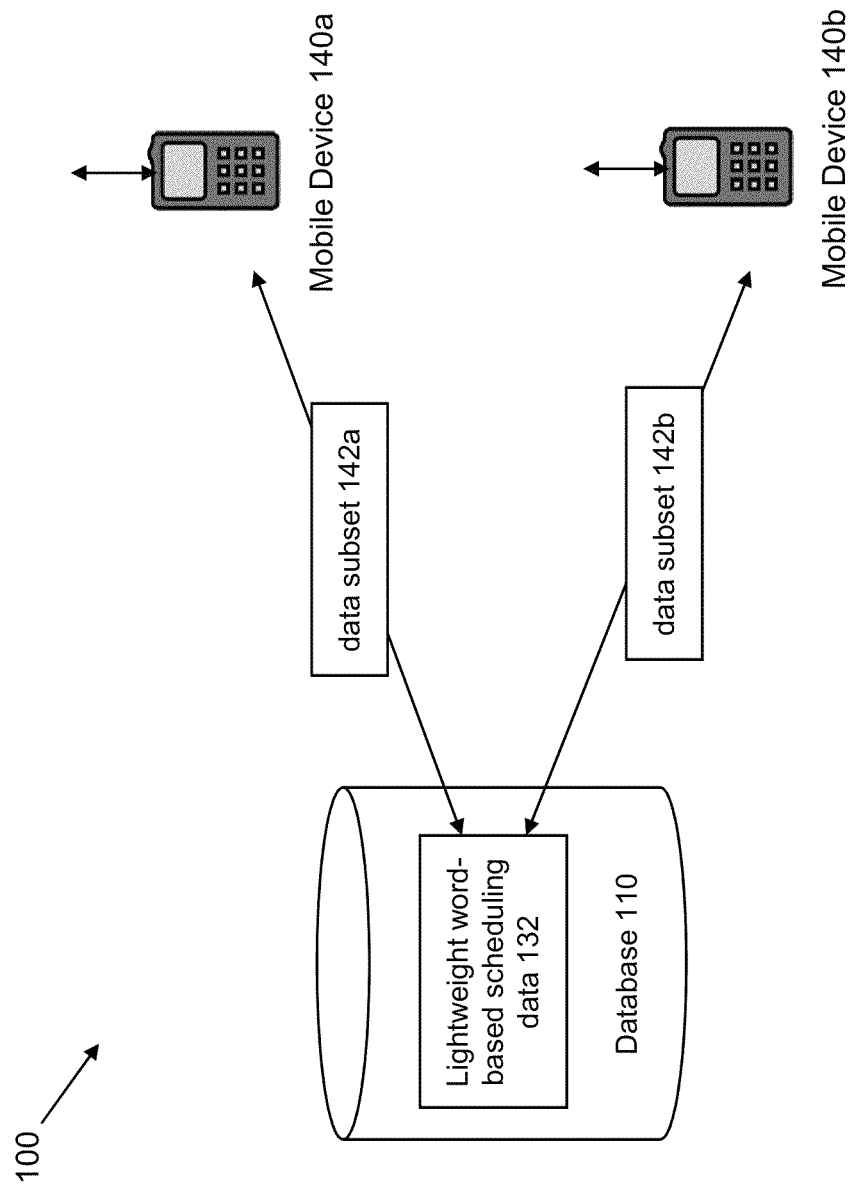

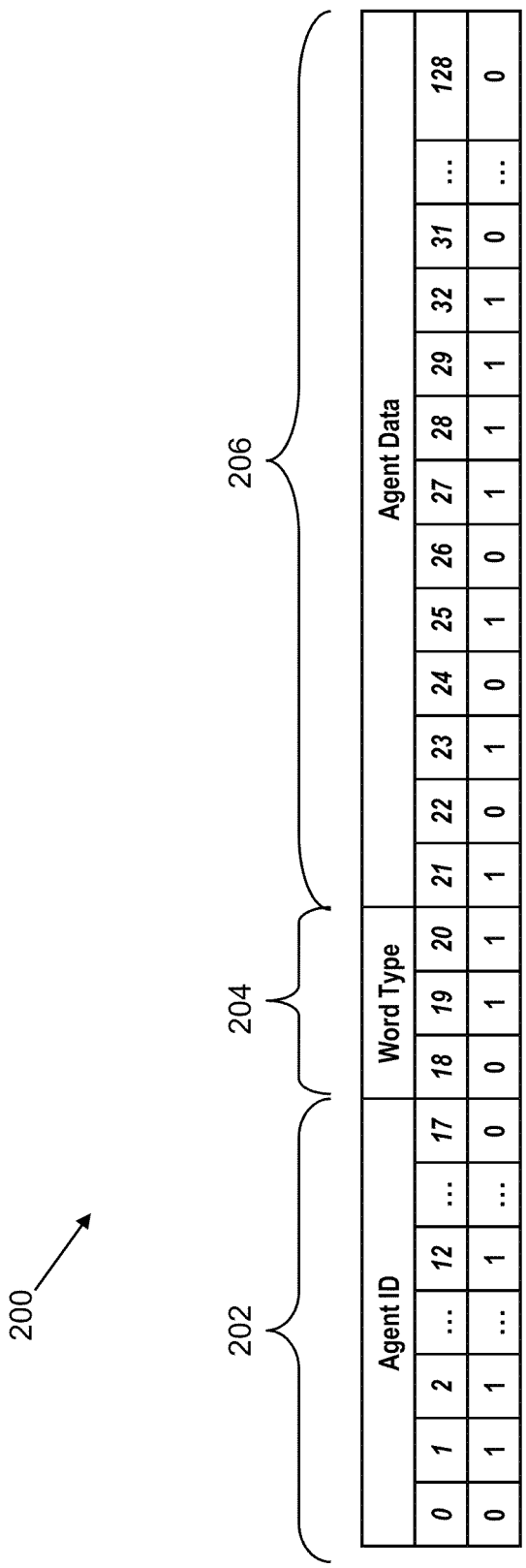

Figure 3A

| Bit | Parameter |
|-----|-----------|
| 21 | Language: English - Expert |
| 22 | Language: Spanish - Expert |
| 23 | Language: French - Expert |
| 24 | Install Basic Phone Line - Expert |
| 25 | Install DSL Line – Expert |
| 26 | Repair Phone Line – Intermediate |
| 27 | Repair DSL line |
| ... | ... |

Figure 3B

| Bit | Parameter |
|---|---|
| 21 | Monday 9AM-10AM |
| 22 | Monday 10AM-11AM |
| 23 | Monday 12PM-1PM |
| 24 | Monday 1PM-2PM |
| 25 | Monday 2PM-3PM |
| 26 | Monday 3PM-4PM |
| 27 | Monday 5PM-6PM |
| ... | ... |

Figure 4B

Agent Data

| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|----|----|----|----|----|----|----|----|----|----|----|----|----|----|----|----|----|----|----|----|----|----|----|----|
| 1  | 0  | 1  | 0  | 1  | 0  | 1  | 0  | 1  | 1  | 0  | 0  | 1  | 1  | 0  | 0  | 1  | 0  | 0  | 1  | 0  | 1  | 0  | 1  |

Agent Data

| 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|----|----|----|----|----|----|----|----|----|----|----|----|----|----|----|----|----|----|----|----|----|----|----|----|
| 1  | 0  | 0  | 1  | 1  | 0  | 0  | 0  | 1  | 1  | 0  | 0  | 1  | 1  | 0  | 1  | 0  | 0  | 0  | 1  | 0  | 1  | 1  | 0  |

Agent Data

| 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
|----|----|----|----|----|----|----|----|----|----|----|----|----|----|----|----|----|----|----|----|----|----|----|----|
| 0  | 1  | 0  | 1  | 1  | 0  | 0  | 0  | 1  | 1  | 0  | 0  | 1  | 1  | 0  | 0  | 0  | 0  | 0  | 1  | 0  | 1  | 1  | 0  |

Figure 4C

Agent Data

| 96 | 97 | 98 | 99 | 100 | 101 | 102 | 103 | 104 | 105 | 106 | 107 | 108 | 109 | 110 | 111 | 112 | 113 | 114 | 115 | 116 | 117 |
|----|----|----|----|-----|-----|-----|-----|-----|-----|-----|-----|-----|-----|-----|-----|-----|-----|-----|-----|-----|-----|
| 1  | 1  | 1  | 0  | 0   | 1   | 1   | 0   | 1   | 1   | 0   | 0   | 1   | 1   | 0   | 0   | 0   | 0   | 0   | 1   | 0   | 1   |

Agent Data

| 118 | 119 | 120 | 121 | 122 | 123 | 124 | 125 | 126 | 127 | 128 |
|-----|-----|-----|-----|-----|-----|-----|-----|-----|-----|-----|
| 1   | 0   | 0   | 1   | 1   | 0   | 0   | 0   | 1   | 1   | 0   |

Figure 4D

| Bit | Value | Parameter | Meaning |
|---|---|---|---|
| 21 | 1 | Language: English - Expert | Agent #156464 is expert English speaker |
| 22 | 1 | Language: Spanish - Expert | Agent #156464 is expert Spanish speaker |
| 23 | 0 | Language: French - Expert | Agent #156464 does not speak French |
| 24 | 1 | Install Basic Phone Line – Expert | Agent #156464 is expert in installing phone line |
| 25 | 0 | Install DSL Line – Expert | Agent #156464 does not install DSL line |
| 26 | 1 | Repair Phone Line – Intermediate | Agent #156464 is intermediate in repairing phone line |
| 27 | 0 | Repair DSL line | Agent #156464 does not repair DSL line |
| ... | | | ... |

| Bit | Value | Parameter | Meaning |
|---|---|---|---|
| 21 | 1 | Monday 9AM-10AM | Monday 9AM-10AM not available |
| 22 | 1 | Monday 10AM-11AM | Monday 10AM-11AM not available |
| 23 | 0 | Monday 12PM-1PM | Monday 12PM-1PM available |
| 24 | 1 | Monday 1PM-2PM | Monday 1PM-2PM not available |
| ... | ... | ... | ... |

444

METHOD AND SYSTEM FOR IMPLEMENTING AN ON-DEMAND SCHEDULER

RELATED APPLICATIONS

The present application is related to co-pending U.S. Ser. No. 13/118,299, entitled "METHOD AND SYSTEM FOR IMPLEMENTING AN ON-DEMAND SCHEDULER IN A MOBILE DEVICE", filed on even date herewith, which is hereby incorporated by reference in its entirety.

BACKGROUND

Scheduling is an activity that is performed for all manners of enterprises and organizations. For many modern enterprises and organizations, scheduling is a very complex and compute-intensive task. This is because the scheduling process may need to take into account multiple disparate factors in order to fulfill the scheduling objectives.

For example, consider the typical request by a customer to a local utility or services company to schedule a repair visit. The utility/services company may have hundreds or thousands of repair personnel on its payroll, and there is the desire for the company to efficiently and effectively identify the specific repair person that is best suited to be scheduled for the job. This scheduling process may need to take into account numerous variables for the personnel to schedule, such as the availability, location, technical skill sets, and language ability.

Given this large set of different data, it is possible that the data that needs to be analyzed to perform the scheduling task is spread among multiple different database objects and storage entities. For example, it is possible that a calendaring database/table is used to store the calendars/schedules of the service personnel, an entirely separate database/table is used to track language abilities, and yet another database/table is used to track the technical training history of the personnel. Therefore, the process to search these databases/tables to perform scheduling may need to involve multiple costly operations (e.g., join operations) in order to determine the appropriate personnel to schedule for the task.

The problem is further complicated by the fact that this disparate set of data may potentially end up being an extremely large set of data, since many companies have hundreds or thousands of personnel for which data is stored in the databases/tables. This large set of data further increases the probable processing costs and time, as well as forcing large memory and compute requirements to perform the scheduling. The infrastructure requirements for enterprise schedules are extensive enough such that only connected-mode process can be used to perform the scheduling tasks, which is particularly problematic for enterprises that may need to perform scheduling in a disconnected or mobile mode.

In fact, given a large enough set of data that needs to be processed, it is quite possible that the scheduling activities can only be performed in a non-realtime manner, to allow batch processing of the data to perform the scheduling. In this situation, all the scheduling activity would need to happens well in advance and the field agents are notified of their jobs/tasks at the beginning of the day. However, in the today's dynamic world there is a need to be able to schedule activities on-demand. Most of the scheduler and/or optimizer in the market today do not have on-demand support.

Therefore, there is a need for an improved approach for implementing schedulers that address at least these problems.

SUMMARY

Some embodiments of the present invention are directed to an improved approach for implementing an on-demand scheduler and the structures to support realtime on-demand schedulers. Some embodiments pertain to a lightweight word-based structure for holding scheduling-related data. Using this lightweight word-based structure enables on-demand and real-time scheduling. This type of lightweight structure also permits scheduling activities to be performed in a disconnected mode, which can then be later synchronized with the server to confirm the booking In addition to appointment scheduling, this technique can also be implemented for scheduling of any type of resource, e.g., airline ticket booking Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIGS. 1A-B illustrate example systems according to embodiments of the invention.

FIG. 2 illustrates word-based scheduling data according to an embodiment of the invention.

FIGS. 3A-B shows mappings of bits to specific items of agent data according to an embodiment of the invention.

FIGS. 4A-E illustrate an example word-based set of data according to an embodiment of the invention.

DETAILED DESCRIPTION

Some embodiments of the present invention are directed to an improved approach for implementing an on-demand scheduler and the structures to support realtime on-demand schedulers. Some embodiments pertain to a lightweight word-based structure for holding scheduling-related data. Using this lightweight word-based structure enables on-demand and real-time scheduling. This type of lightweight structure also permits scheduling activities to be performed in a disconnected mode, which can then be later synchronized with the server to confirm the booking In addition to appointment scheduling, this technique can also be implemented for scheduling of any type of resource, e.g., airline ticket booking.

Figure 1A:
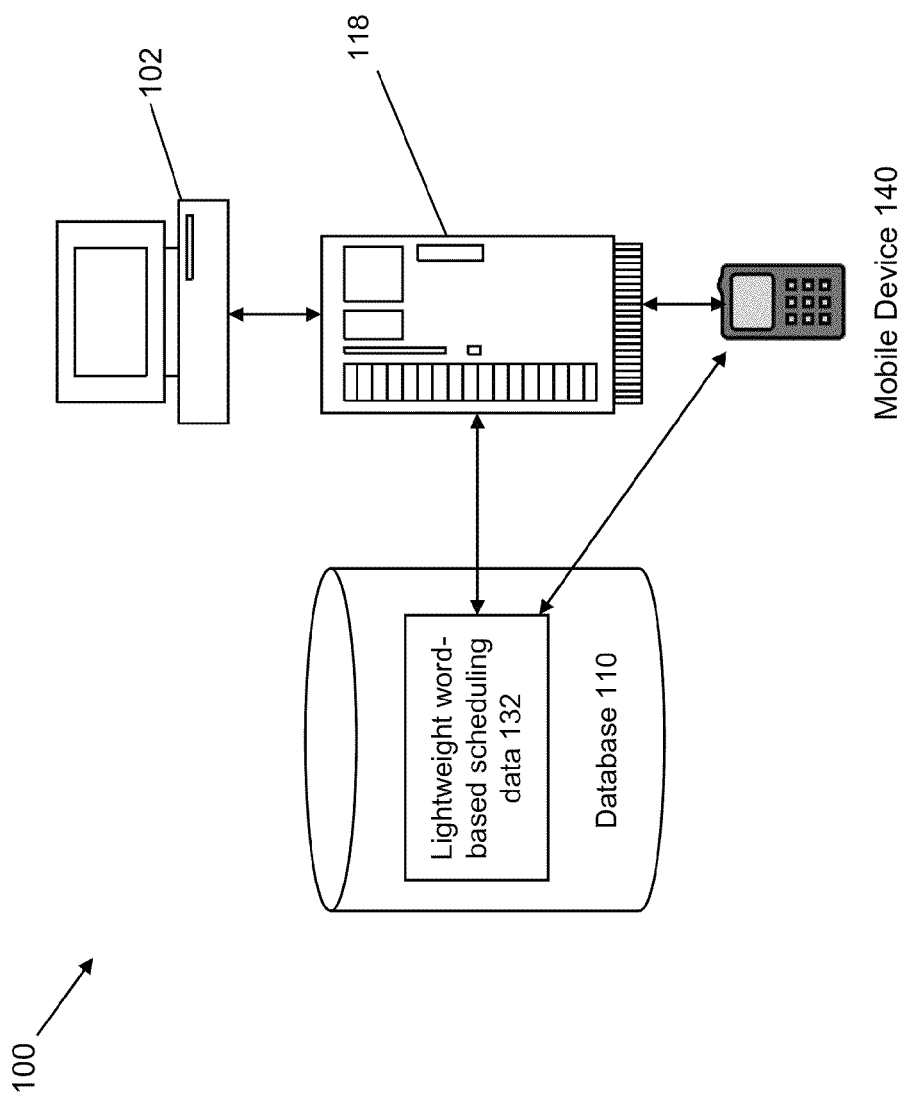

FIG. 1A shows an architecture of a system 100 for implementing an on-demand scheduler according to some embodiments of the invention. System 100 may include one or more users at one or more user stations 102 that operate the system 100 to use a database server 118 to perform scheduling activities. User station 102 comprises any type of computing station that may be used to operate or interface with a server 118. Examples of such user stations 102 include for example, workstations, personal computers, or remote computing terminals. The users at user station 102 correspond to any individual, organization, or other entity that uses system 100 to perform scheduling tasks. User station 102 comprises a display device, such as a display monitor or screen, for displaying scheduling data and interface elements to users at the user station 102. User station 102 may also comprises one or more input devices for the user to provide operational control over the activities of system 100, such as a mouse, touch screen, keypad, or keyboard.

According to some embodiments of the invention, the scheduling system 100 performs scheduling using a set of very lightweight word-based scheduling data 132. Because of the extremely compact nature of the scheduling data 132, system 100 may be implemented to also include one or more mobile devices 140 to perform scheduling activities. This because the compactness of the scheduling data 132 permits the scheduling data 132 to be used in the mobile device 140, even in a disconnected mode of operation. Mobile device 140 comprises any type of portable or small-scale device, e.g., a mobile computing device that is capable of being operated without a physical connection to server 118. Examples of such mobile devices 140 include, for example, mobile telephones, computing pads, computing tablets, and laptop computers.

The master scheduling data 132 may be stored in database 110 on one or more computer readable mediums or storage devices. The computer readable storage devices comprise any combination of hardware and software that allows for ready access to the data within database 110. For example, the computer readable storage device could be implemented as computer memory or disk drives operatively managed by an operating system. Given the compactness of the scheduling data 132 according to some embodiments of the invention, a copy of some or all of the scheduling data 132 may be loaded into the mobile device 140, e.g., to implement scheduling in real-time in a disconnected mode.

According to some embodiments of the invention, scheduling data 132 comprises a lightweight word-based set of data to hold information that is useful for scheduling purposes and which provides a low memory-intensive structure for the data 132. In this approach, a resource may be represented using a set of one or more words. Each word comprises a bitmapped structure, where the bits of the word map to scheduling-related attributes for that resource. Different words may be associated with the same resource, where each word addresses a different type of attribute for that resource. According to one embodiment, the word structure for a resource is based on a configurable set of 128-bit words (16 Byte words).

This type of word allows for light-weight storage for data in memory, which otherwise would be several kilobytes when put together in the form of traditional database records and which would otherwise consume tremendous amount of processing power when reading and writing from/to a RDBMS for every transaction. The reasons this approach is advantageous is that today's scheduling optimizer normally has to deal with huge amounts of data in the form of database records that identify different data for a resource, such as time slots, skill set, cost, availability, etc. In order for the scheduler optimizer to process this data, memory space must be consumed to store the data and then a significant amount of processing power is consumed when iterating through these records. The low memory-intensive solution of the current embodiment permits much faster processed due to iterations that need only be performed on a very tiny set of 128-bit words. This makes it possible to implement a very fast schedule optimizer.

This type of fast schedule optimizer of the current embodiment will naturally allow for on-demand and real-time scheduling in the server connected mode. These appointments are quickly optimized (e.g., for cost and efficiency) using the faster schedule optimizer. Because of the low-memory requirements of storing the resource/scheduling data, on-demand appointment scheduling can also easily be performed in a disconnected (from server) handheld client. Because each word is a 16-byte payload it is easily loaded into memory on a server or even a simple hand-held device, which are storage efficient. This therefore allows for both server side processing in the connected more as well as client-side in the disconnected mode.

In case of the server connected mode, the server can load all the words for all the resources in the memory at the time of server start from the database. These words remain in the memory for the duration of server run. Any updates to the resource information can be simultaneously processed within a single transaction on the in-memory words as well as the database. This ensures that the in-memory representation is an exact reflection of the information stored in the database.

Having the words in memory facilitates the higher speed of processing as it removes the latency associated with database access for every transaction. With the faster in-memory optimization, this permits on-demand and real-time resource scheduling to be achieved. Any scheduling that occurs in the server connected mode is easily persisted in the database.

In case of the client disconnected mode, the client can load all the words for the specific resource or group of resources in the memory at the time of client before it disconnects from the server. These words remain in the memory for the duration of client run. Any updates to the agent information will have to be stored locally on the client device and synchronized with the server at the next connection to the server. Conflicts, if any, can be resolved at the server and the in-memory words on the client when the data is refreshed. The server/database is made aware of the frequency of synchronizations and the audit trail of each synchronization activity.

In addition to the higher speed of processing due to in-memory computation, flexibility can also be obtained to perform tentative scheduling on a demand basis even though the user is disconnected from the server. This scheduling can be persisted in the database when the next connection is obtained to the server for synchronization.

FIG. 1B shows an approach to utilize the lightweight, word-based scheduling data 132 where the mobile devices 104*a* and 104*b* themselves operate as hubs to manage scheduling. Because of the lightweight nature of the scheduling data 132, the mobile devices 140*a* and 140*b* can load the words for the specific resource or group of resources in their memories, where these words are subsets 142*a* and 142*b*, respectively, of the entirety of the word-based data 132. Any updates to the mobile-based information 142*a* and 142*b* will be stored locally on the mobile device 142*a-b*, and later synchronized with the main set of data 132 at the database 110.

Any suitable approach can be taken to select the subset of data to load onto the mobile devices. One example approach is to use location-based criteria to identify the subsets of data. For example, consider if the entire set of data 132 is nationwide in scope, but each of the mobile devices 140*a* and 104*b* are limited to specific cities or regions. In this situation, the data subsets 142*a* and 142*b* to be loaded onto these mobile devices 104*a* and 140*b* can be determined by the locations associated with the word-based data 132. This location-based data may be part of the attribute information associated with the word-based data 132. In addition, this information may be derived from other data gathered for the agents/resources associated with the word-based data 132. For example, GPS-based location data for phones or other mobile devices corresponding to an agent may be used to determine whether the location of that agent is within a region associated with a data subset 142*a* or 142*b* that should be loaded onto a particular mobile device 104*a* or 140*b*.

FIG. 2 shows an example format for lightweight, word-based scheduling data according to some embodiments of the invention. This example illustrates word-based scheduling data that may be used to schedule appointments for agent/enterprise personnel. While the current description identifies a very specific type of word directed to agent scheduling and is described having a very particular set of bit designations in the word, the invention is not restricted to this specific illustrative example, and indeed, may be applied for scheduling of any type of resource using any suitable combination of bit structures for the words. Indeed, embodiments of the invention may be applied to enable configurable words such that the format and structure of the word-based data can be configured by a user to suit his/her needs for that data, which allows the structure of the word, the fields within the words, and/or the number of bits for the fields within the words to change depending upon the needs of the user. As such, the following description is intended to be illustrative in nature, and not limiting unless claimed as such.

An agent may correspond to one or more words 200. Each word 200 relates to information about an agent that is relevant to scheduling of that agent, where each word corresponds to a different set of information about that agent. Word 200 includes information that is defined by its individual constituents using bits within the word.

The word 200 includes an Agent ID field 202. The Agent ID field 202 is used to hold the identifier number of a particular agent, to relate the word 200 to that agent associated with the identifier number. Any suitable number of bits may be used for the agent ID field 202, depending on the number of agents in an enterprise that needs to be scheduled. In some embodiments, agent ID field 202 comprises 18 bits, which supports 262,144 combinations of different agent identifiers.

The word 200 also includes a word type field 204. As noted above, an agent may be associated with multiple words 200, where each word 200 relates to a different topic or subject associated with the agent relevant to scheduling for that agent. The word type field 204 is used to specify the type of data that is being captured in a particular word 200. Any suitable number of bits may be used to represent the word type field 204, depending on the number of word types/topics that needs to be associated with agents/resources in the enterprise. In some embodiments, the word type field 204 comprises 3 bits, which supports 8 different types of words.

In the example of FIG. 2, the word type field 204 includes Bit #18, #19, and #20 to identify the word type. With these three bits, and an application can define a maximum of 8 different types of words for a given agent. The following are examples of certain word types that may be useful to perform scheduling of an agent for appointments in some embodiments of the invention:

0. Cost Factor+Skills: Cost factor can be defined as a skill with a range of 5 bits where the first bit represents low cost and the $5^{th}$ bit represent the highest cost.
1. Skills only
2. Geographical Coverage Area
3. Vacation/break—hourly (Max 13.375 working days=107 1-hour slots)
4. Time Slots—hourly (Max 13.3755 working days=107 1-hour slots)
5. Time Slots—half hourly (Max 6.6875 working days=107 ½-hour slots)

Of course, the number of word types supported by embodiments of the invention could be configurable to improve the flexibility for future expansion, e.g., by increasing the number of bits to allow for 16 or 32 words. But that option comes with a cost of losing one or two bits of agent data to a next word.

The rest of the bits in word 200 support the agent data field 206, which generally corresponds to the data "payload" for the scheduling data. In the example of FIG. 2, the agent data 206 comprises 107 bits, which supports 107 binary parameters/variables of information for the agent. The bits representing the agent data conveys one of the messages as below, depending on context:

'0'—represents {Unset, No, Available, False, OFF, Open, Free, Inactive, . . . }
'1'—represents {Set, Yes, Booked, True, ON, Closed, Busy, Active, . . . }

Every bit in the Agent Data section for the Word Type 1 (binary 001) can be configured to represent one skill (plus the level of skill). For example, for the skill of "French Language", example levels of this skill may include Expert, Native, Novice, etc. Using a similar word for availability of the agent, one can find a perfect match for the job at hand. The parameter to bit assignment should be pre-defined inside the application separately.

This way of encoding the information also inherently provides data security. Anybody attempting to intercept the transmission will need to know the entire application configuration in order to make sense out of the data captured in transit. Even if someone hacks into the system and downloads the entire word table, that person would still be unable to decipher the meaning of the word unless they understand the configuration which gives each word its unique definition. Because of the flexibility to define the word as needed by any deploying user of this invention, it would be very difficult to find words from different user's definitions that are exactly same, and hence even a company/organization that uses this invention for its own scheduling data would not be able to decipher the word-based data for another company/organization (unless they are both using the exact same word definitions and configurations).

FIG. 3A shows an illustrative mapping 300 that may be applied for the bits of the agent data field for a word type used to represent the "skills" of an agent. Mapping 300 includes a column 302 that identifies the specific bit being addressed by the mapping 300. Column 304 identifies the meaning of that bit. Each row in the mappings 300 corresponds to a different bit within the agent data field, which therefore corresponds to a different skill being tracked by skill word type 300. For example, row 310 for bit #21 is used to identify whether or not the agent is an expert in the English language. Similarly, row 312 and 314 correspond to bits #22 for Spanish language and #23 for French language skills, respectively. Therefore, bits #21, 22, and 23 relate to language-related skills tracked by the agent data. Rows 316, 318, 320, and 322 relate to technical skills possessed by the agent. For example, row 316 corresponds to bit position #24, which is used to identify whether the agent possess an expert skill in installing basic telephone lines. Similarly, row 318 corresponding to bit position #25 identifies whether the agent possess an expert skill in DSL line installation, row 320 corresponding to bit position #26 identifies whether the agent possess an intermediate skill in phone line repairs, and row 322 corresponding to bit position #27 identifies whether the agent possess an expert skill in DSL line repairs.

Other word types can be used to track additional items of scheduling-related information for an agent. For example, FIG. 3B shows a mapping 330 for a word type that is used to track time slots on an hourly basis, where each bit indicates the availability of that agent for the relevant time slot. Column 332 identifies a bit, and column 334 identifies the time slot corresponding to that bit. For example, row 340 relates to bit 21, which corresponds to the Monday 9 AM to 10 AM timeslot. Similarly, row 342 relates to bit 22, which corresponds to the Monday 10 AM to 11 AM timeslot, row 344 relates to bit 23, which corresponds to the Monday 12 PM to 1 PM timeslot, row 346 relates to bit 24, which corresponds to the Monday 1 PM to 2 PM timeslot, row 348 relates to bit 25, which corresponds to the Monday 2 PM to 3 PM timeslot, row 350 relates to bit 26, which corresponds to the Monday 3 PM to 4 PM timeslot, and row 352 relates to bit 27, which corresponds to the Monday 4 PM to 5 PM timeslot.

To illustrate how this lightweight word can be used in the real-world, consider the situation in which an organization needs to book an appointment for a field service agent to install a new phone line at customer's residence, the customer requires an agent that speaks English, and the customer is only available on Monday at 12 PM.

Using the information stored in the word-based data will allow the scheduling system to obtain the information about an agent's availability for booking during a timeslot and if the agent has the skills required for the job. The words for the company's agents can be loaded into memory, and an agent matching the customer's requirements can be found by using binary comparisons and masking on the agent data.

Figure 4A:
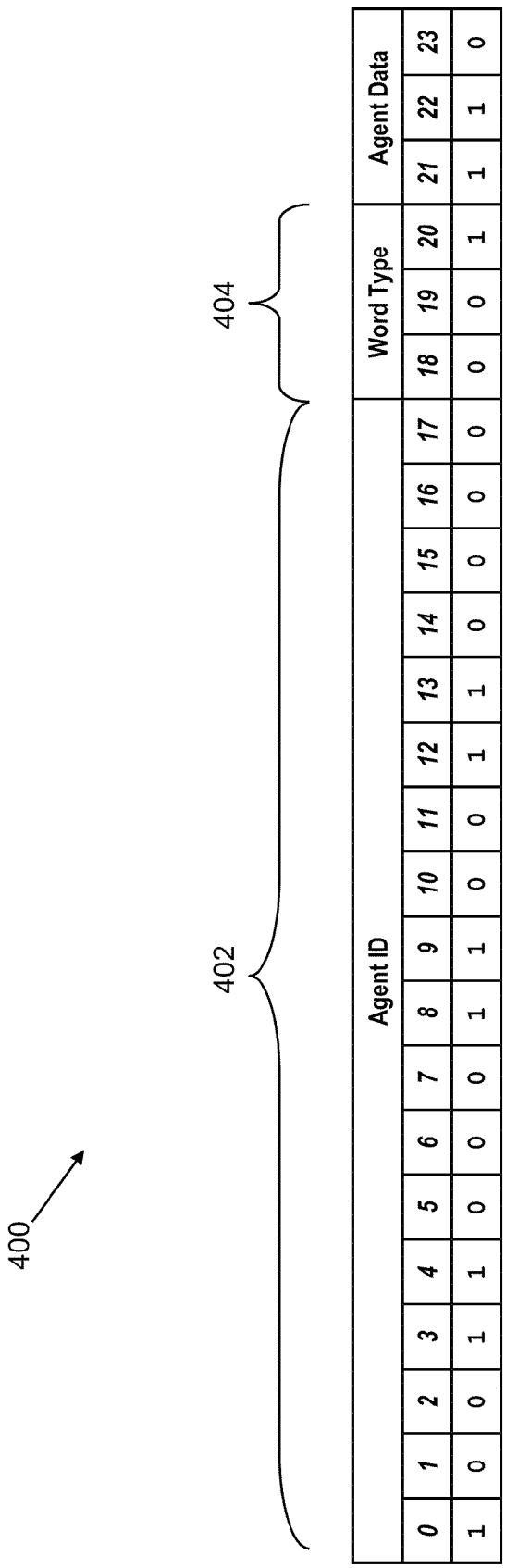

For example, FIGS. 4A-E show an example word that may have resulted from a successful search of the word-based scheduling data. FIGS. 4A-C show the 128 bits of the word 400, while FIGS. 4D and 4E shows the meaning of the bits within the agent data portion of that word 400. As previously mentioned, every word is split into multiple constituents but it includes a unique agent identifier. FIG. 4A shows agent ID field 402 which identifies the Agent ID of 156,464 (which is the binary representation 10 0110 0011 0011 0000). The Word Type field 404 has a value of "1", which indicates a word type of "Skills" only (e.g., the binary representation is 001).

The agent data extends from bit 21 to 128 across FIGS. 4A to 4C. Every bit in this section represents exactly one skill. It is assumed that 3A maps the bits in the agent data portion to certain skills possessed by the agent. On this basis, FIG. 4D shows the meaning of the word 400 for the skills associated with the agent. Here, #21 represents whether or not the agent possesses an expert skill in the English Language. Since this bit 410 is set to "1", this means that the agent associate with word 400 is indeed an expert in the English language. Bit #24 represents whether or not the agent possesses an expert skill in phone line installations. Since this bit 418 is set to "1", this means that the agent associate with word 400 is also an expert in this skill of installing phone lines. Therefore, this agent possesses the skills that are required by the customer in this example scenario.

Next, the schedule for this agent must be checked to see if the agent is free at the desired time slot. Assume that the word 400 in FIGS. 4A-C represents hourly time slots for the agent (i.e., the word type field 404 is set to a value indicative of this word type—e.g., with a value of "4"). The mappings 330 of FIG. 3B can then be used to check whether the agent has available time in the correct time slot. Here, the customer is seeking an appointment for 12 PM on Monday. According to mappings 330, this time slot corresponds to bit #23 in the agent data field, so a check is made of that bit to see if it is set to value "0" (to indicate availability of that time slot). Here, bit #23 is indeed set to "0", which means this agent can therefore be scheduled for an appointment at that desired time slot. FIG. 4E generally shows the meaning of the first few bits in the scheduling word for the agent, where row 444 indicates the availability of the Monday 12 PM to 1 PM time slot for the agent.

Figure 5:
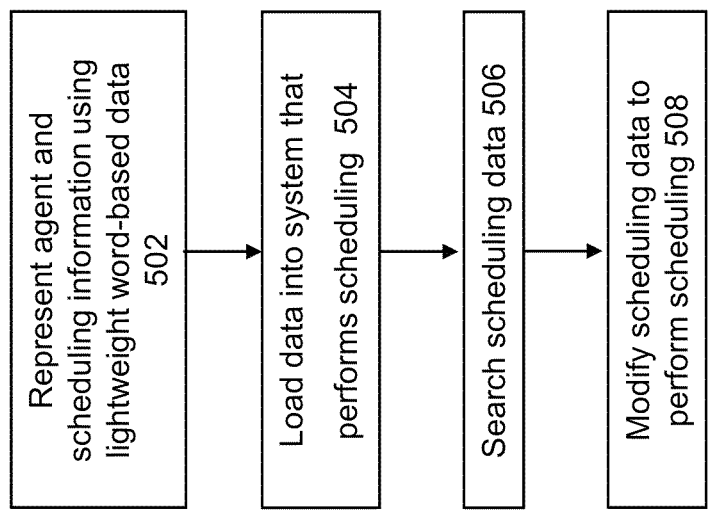
FIG. 5 illustrates a flowchart of an approach to implement scheduling according to an embodiment of the invention.

FIG. 5 shows a flowchart of an embodiment of the invention for using the lightweight word-based scheduling data to implement a scheduling system. At 502, information about the resource/agent (hereinafter "agent") is represented using word-based structures. One or more words may be associated with a particular agent, where each word corresponds to a word type that relates to a specific set of scheduling-related data about that agent. Example words and word types for agent data were presented above.

At 504, the word-based data is loaded into the scheduling system. As discussed above, the lightweight nature of the word-based data provides for a very compact set of data which can easily be loaded into even the most resource/memory limited systems. This allows the scheduling data to be used in multiple types of computing systems, even mobile and handheld devices.

At 506, the data can be searched to identify an agent that matches the customer's requirements. Binary data processing can be utilized to perform very fast searching of the agent data. A binary mask can be created that corresponds to the specific set of skills/scheduling needs for the proposed appointment. A binary operation (e.g., an XOR operation) can be performed against the mask to identify which, if any, of the agents have suitable qualifications for the proposed appointment.

Once a match is found, then at 508, the scheduling data is modified to indicate the new appointment. For example, for the agent that meets the requirements, the word type that includes the calendar of the agent can be modified to indicate that the agent is no longer available for the now-filled time slot.

Therefore, what ahs been described is a novel approach for implementing a very efficient scheduling system and structure. The lightweight nature of the word-based structure permits an enterprise to represent data using a very compact set of data. The compactness and bit-based nature of the data permits a solution that can be used with any type of system, and results in very fast processing times to generate optimal resource scheduling. Schedules and appointment can be scheduled on-demand because the schedule optimizer is much faster when booking an appointment/schedule on a server connected mode. This facilitates the efficient booking of a tentative appointment/schedule, even while disconnected from the server. In addition, the encoding of the agent data adds a layer of data security to the current embodiment.

System Architecture Overview

Figure 6:
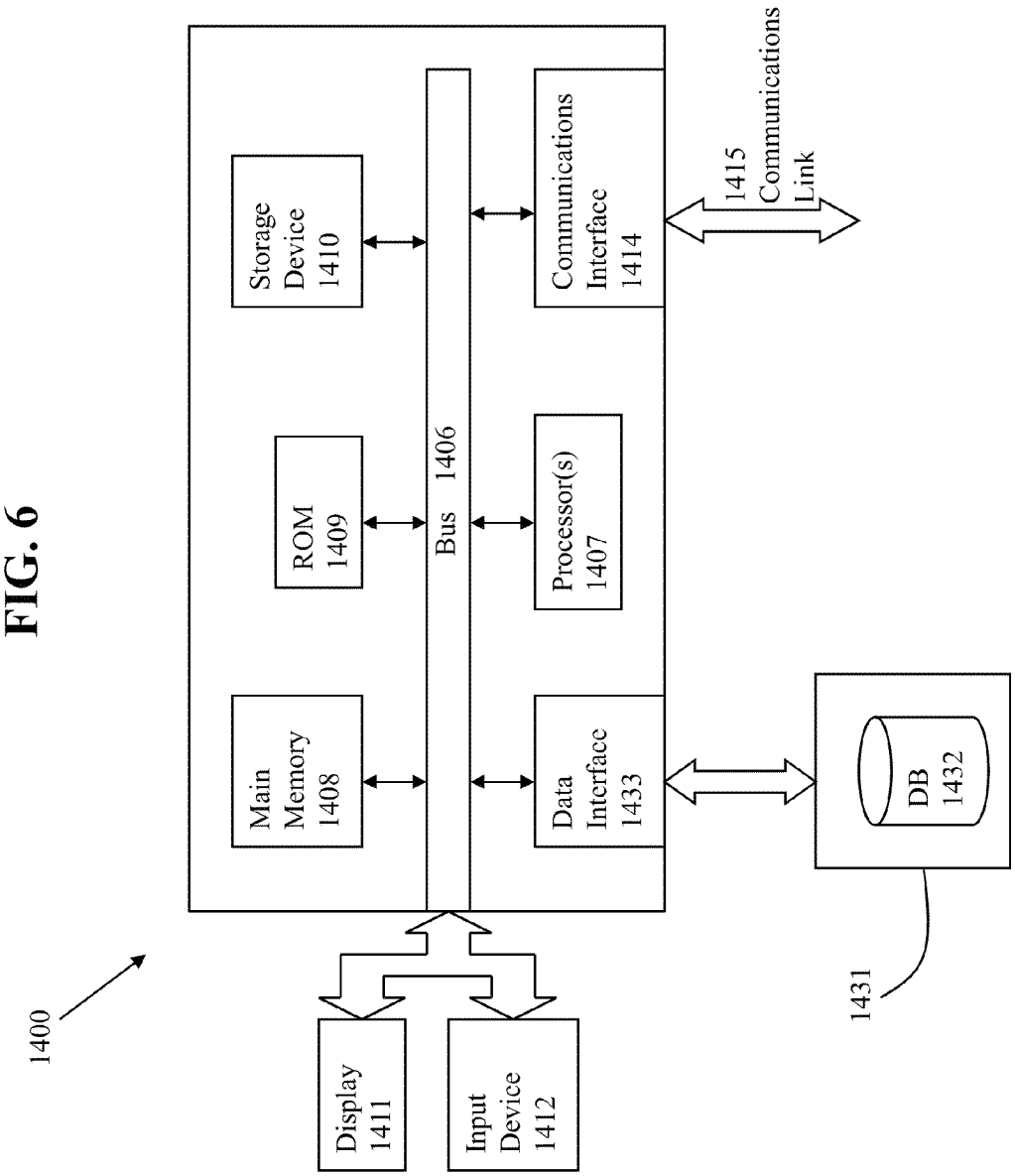
FIG. 6 depicts a computerized system on which an embodiment of the invention can be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method to implement scheduling that is performed with a processor, comprising:
   identifying word-based data for analysis, wherein the word-based data is used to store information about a resource, where a bit in the word-based data correspond to an attribute about the resource relevant for scheduling;
   analyzing the word-based data according to a search criteria to identify the resource as a candidate for scheduling; and
   scheduling the resource by modifying the word-data.

2. The method of claim 1 in which the word-based data comprises a first portion to identify the resource, a second portion to identify a word type, and a third portion to hold information about attributes for the resource.

3. The method of claim 1 in which the resource is associated with multiple words, and in which each type of the multiple words stores different types of word-based data for the resource.

4. The method of claim 3 in which the type of the multiple words corresponds to a cost factor type, skill type, geographical coverage type, time slot type, vacation type, or break type.

5. The method of claim 1 in which the resource corresponds to personnel of an enterprise, and the scheduling is performed to make an appointment for the personnel.

6. The method of claim 1 in which the word-data is analyzed by analyzing the bit within the word-based data.

7. The method of claim 6 in which bit masks are used in conjunction with an XOR operation to analyze the word-based data.

8. The method of claim 1 in which scheduling analysis is performed on a mobile device.

9. The method of claim 1 in which scheduling analysis is performed in a server connected mode or in a client disconnected mode.

10. The method of claim 1 in which scheduling analysis is performed on-demand in real-time.

11. The method of claim 1 in which the word-based data provides data security because of the configuration of the word-based data.

12. A computer program product embodied on a non-transitory computer usable storage medium, the computer usable storage medium having stored thereon a sequence of instructions which, when executed by a processor causes the processor to execute a method to implement scheduling, the method comprising:
    identifying word-based data for analysis, wherein the word-based data is used to store information about a resource, where a bit in the word-based data correspond to an attribute about the resource relevant for scheduling;
    analyzing the word-based data according to a search criteria to identify the resource as a candidate for scheduling; and
    scheduling the resource by modifying the word-data.

13. The computer program product of claim 12 in which the word-based data comprises a first portion to identify the resource, a second portion to identify a word type, and a third portion to hold information about attributes for the resource.

14. The computer program product of claim 12 in which the resource is associated with multiple words, and in which each type of the multiple words stores different types of word-based data for the resource.

15. The computer program product of claim 14 in which the type of the multiple words corresponds to a cost factor type, skill type, geographical coverage type, time slot type, vacation type, or break type.

16. The computer program product of claim 12 in which the resource corresponds to personnel of an enterprise, and the scheduling is performed to make an appointment for the personnel.

17. The computer program product of claim 12 in which the word-data is analyzed by analyzing the bit within the word-based data.

18. The computer program product of claim 17 in which bit masks are used in conjunction with an XOR operation to analyze the word-based data.

19. The computer program product of claim 12 in which scheduling analysis is performed on a mobile device.

20. The computer program product of claim 12 in which scheduling analysis is performed in a server connected mode or in a client disconnected mode.

21. The computer program product of claim 12 in which scheduling analysis is performed on-demand in real-time.

22. The computer program product of claim 12 in which the word-based data provides data security because of the configuration of the word-based data.

23. A computer-based system to implement scheduling, comprising:
- a computer processor to execute a set of program code instructions;
- a memory to hold the program code instructions, in which the program code instructions comprises program code to identify word-based data for analysis, wherein the word-based data is used to store information about a resource, where a bit in the word-based data corresponds to an attribute about the resource relevant for scheduling, analyze the word-based data according to a search criteria to identify the resource as a candidate for scheduling, and schedule the resource by modifying the word-data.

24. The system of claim 23 in which the word-based data comprises a first portion to identify the resource, a second portion to identify a word type, and a third portion to hold information about attributes for the resource.

25. The system of claim 23 in which the resource is associated with multiple words, and in which each type of the multiple words stores different types of word-based data for the resource.

26. The system of claim 25 in which the type of the multiple words corresponds to a cost factor type, skill type, geographical coverage type, time slot type, vacation type, or break type.

27. The system of claim 23 in which the resource corresponds to personnel of an enterprise, and the scheduling is performed to make an appointment for the personnel.

28. The system of claim 23 in which the program code instructions further comprises program code to analyze the word-data by analyzing the bit within the word-based data.

29. The system of claim 28 in which the program code instructions further comprises program code to use bit masks in conjunction with an XOR operation to analyze the word-based data.

30. The system of claim 23 in which the program code instructions further comprises program code to perform scheduling analysis on a mobile device.

31. The system of claim 23 in which the program code instructions further comprises program code to perform scheduling analysis in a server connected mode or in a client disconnected mode.

32. The system of claim 23 in which the program code instructions further comprises program code to perform scheduling analysis on-demand in real-time.

33. The system of claim 23 in which the word-based data provides data security because of the configuration of the word-based data.

* * * * *

UNITED STATES PATENT AND TRADEMARK OFFICE
CERTIFICATE OF CORRECTION

PATENT NO.        : 8,700,656 B2                                           Page 1 of 1
APPLICATION NO.   : 13/118260
DATED             : April 15, 2014
INVENTOR(S)       : Gutlapalli et al.

It is certified that error appears in the above-identified patent and that said Letters Patent is hereby corrected as shown below:

In the Specification

In column 2, line 15, delete "booking" and insert -- booking. --, therefor.

In column 2, line 17, delete "booking" and insert -- booking. --, therefor.

In column 2, line 51, delete "booking" and insert -- booking. --, therefor.

In column 8, line 35, delete "ahs" and insert -- has --, therefor.

In the Claims

In column 9, line 53, in Claim 1, delete "correspond" and insert -- corresponds --, therefor.

In column 10, line 31, in Claim 12, delete "correspond" and insert -- corresponds --, therefor.

Signed and Sealed this
Twenty-sixth Day of August, 2014

Michelle K. Lee
*Deputy Director of the United States Patent and Trademark Office*